Oct. 10, 1939.   G. A. LYON   2,175,206
HORN ACCESSORY
Filed March 22, 1937   3 Sheets-Sheet 1
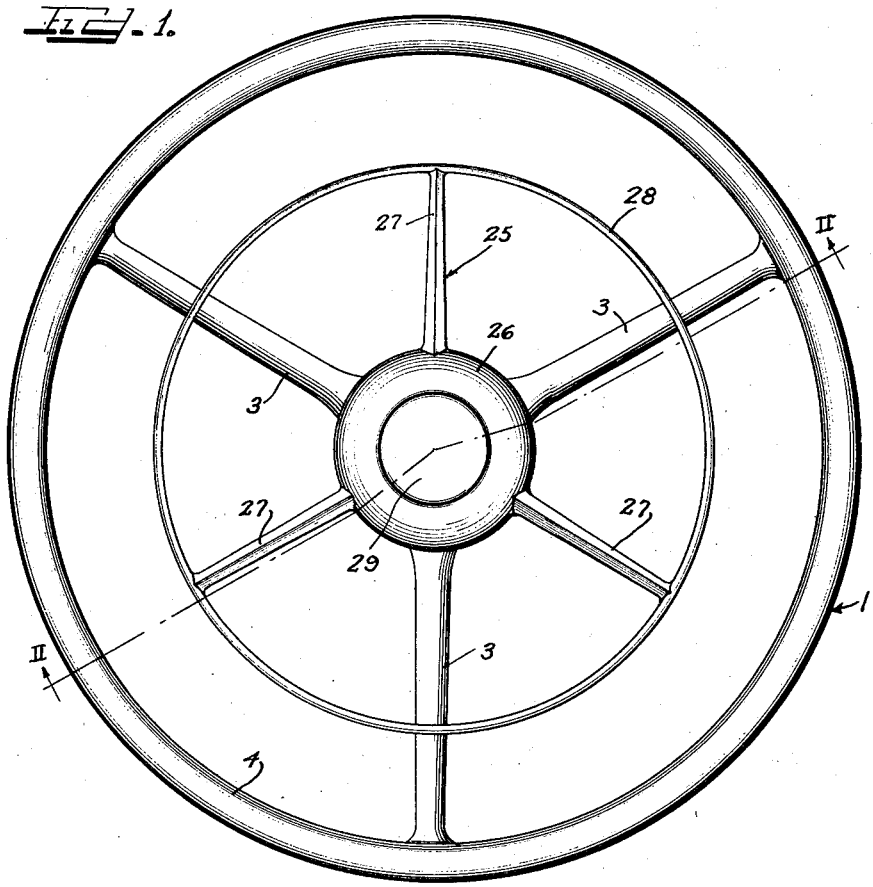
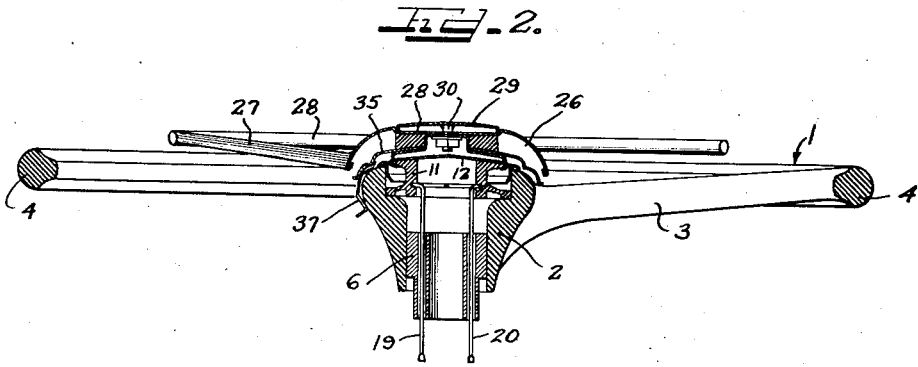
Inventor
GEORGE ALBERT LYON.
by
Attys.

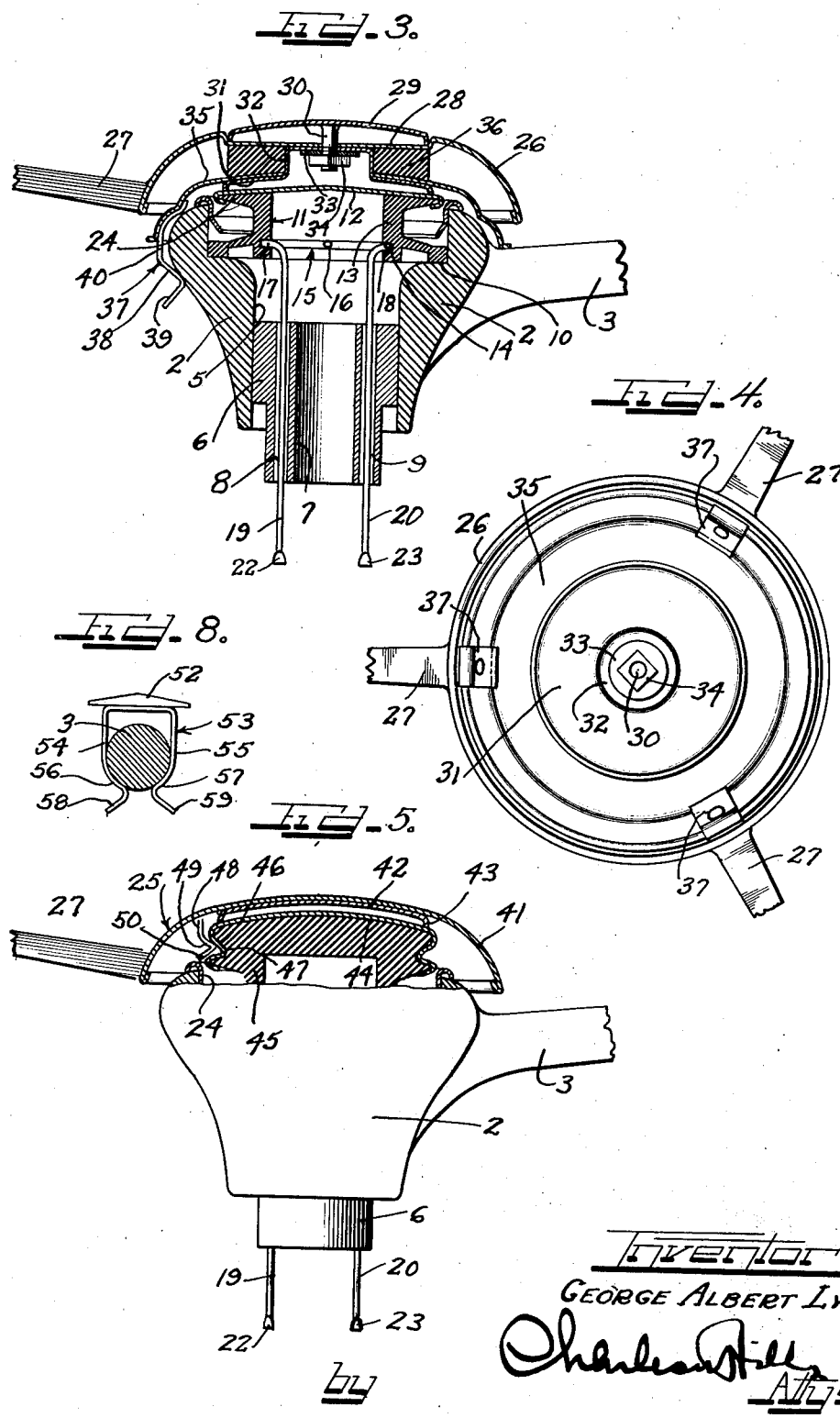

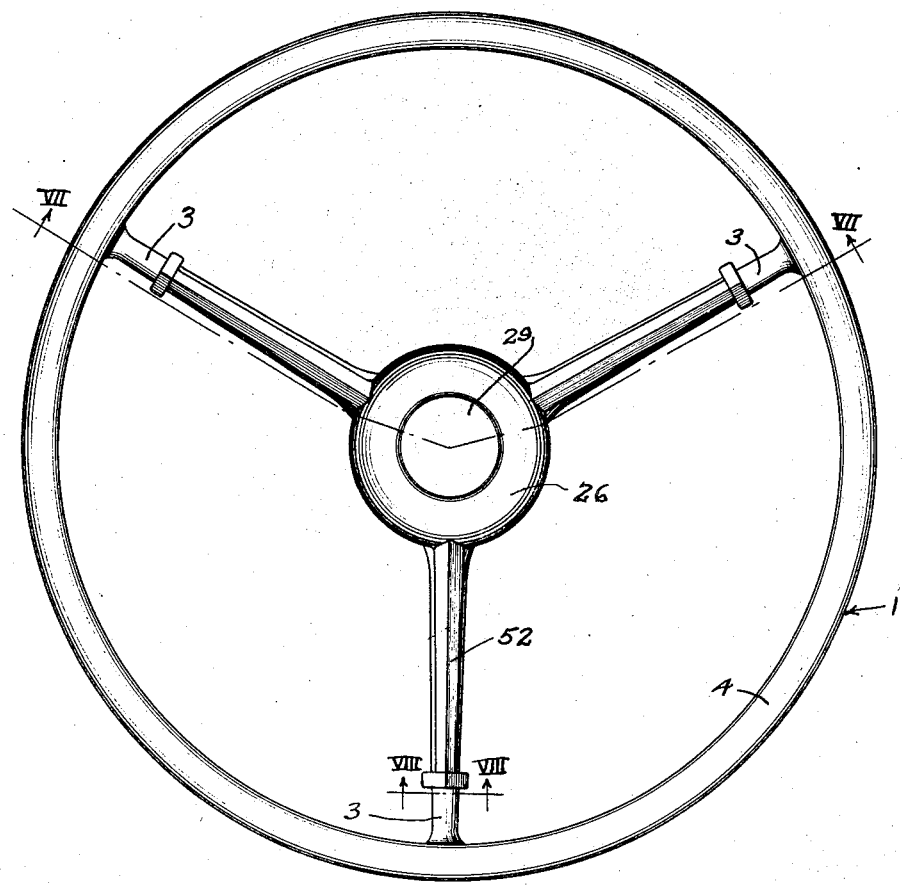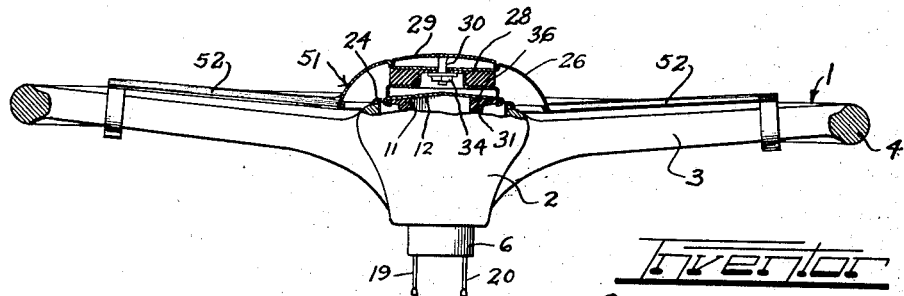

Patented Oct. 10, 1939

2,175,206

UNITED STATES PATENT OFFICE 2,175,206

HORN ACCESSORY

George Albert Lyon, Allenhurst, N. J.

Application March 22, 1937, Serial No. 132,302

19 Claims. (Cl. 74—484)

This invention relates to a horn accessory, and more particularly to an accessory which is adapted to be snapped on either a portion of the steering wheel or on the horn blowing button of the steering wheel assembly.

Many arrangements have, of course, been provided for facilitating operation of horn actuating mechanisms. At the present time most horn signalling switch devices are positioned on the steering wheel post at the center of the steering wheel, this being the most convenient and most easily accessible place for such devices. Such signalling devices are usually in the form of a small button which is adapted to be depressed manually to make the necessary electrical contact. In this type of signalling construction it is at once obvious that it is necessary for the driver to free one hand in order to depress the button to the desired extent. Since this is inconvenient, oftentimes undesirable, and occasionally dangerous, it is desirable to provide some auxiliary mechanism or structure which will permit operation or depression of the horn button without the driver removing his hands from the wheel.

Many arrangements have been employed in the past which permit blowing of the horn by operating the mechanism with the thumb of either hand while the hand remains on the steering wheel. The majority of these devices are not accessories for the ordinary horn button commonly found on motor vehicles but is rather a construction which must be built into the steering wheel assembly at the factory before the motor vehicle is shipped out to the consumer. A few arrangements are known which may be mounted on the steering wheel assembly after the motor vehicle has once been built and shipped, but these mechanisms are relatively complex to assemble and are costly of manufacture.

It is an object of this invention to provide a novel horn accessory which is economical to manufacture, which may be easily snapped into place by the ordinary layman, and which is rugged and reliable in use.

It is another object of this invention to provide a novel ornamental snap-on horn accessory which is adapted to be operably associated with the ordinary horn button of a motor vehicle and which will permit operation of the horn button from a point near the rim of the steering wheel.

It is a further object of this invention to provide a novel horn accessory having means thereon which is adapted to make a detachable snap-on connection with a portion of the hub of the steering wheel.

It is a still further object of this invention to provide a horn accessory having means thereon which is adapted to make a detachable snap-on engagement with the horn button of a steering wheel assembly.

Another and further object of this invention is to provide a novel horn accessory having means thereon which is adapted to make a detachable snap-on engagement with the spokes of a steering wheel.

Another and still further object of this invention is to provide a novel horn accessory comprising a central hub portion which engages a horn blowing member and which is provided with a plurality of radially extending free operating arms.

A further object of this invention is to provide a novel horn accessory having a novel hub construction for engagement with the horn blowing member of a motor vehicle horn signalling mechanism.

The novel features which I believe to be characteristic of my invention are set forth with particularity in the appended claims. My invention itself, however, both as to its organization and manner of construction, together with further objects and advantages thereof, may best be understood by reference to the following description, taken in connection with the accompanying drawings, in which:

Figure 1 is a plan view of a steering wheel and a horn accessory embodying the novel features of the present invention;

Figure 2 is an elevational view partly in cross section taken along the line II—II of Figure 1;

Figure 3 is an enlarged fragmentary elevational view of the central portion of Figure 2;

Figure 4 is an enlarged plan view illustrating the underside of the central portion of the horn accessory illustrated in Figure 1;

Figure 5 is an elevational view partly in cross section of a steering wheel and horn accessory, the latter embodying a modified form of securing means for mounting the horn accessory directly to the horn blowing member of the horn signalling mechanism;

Figure 6 is a plan view of a steering wheel and a different form of horn accessory than those shown in Figures 1 to 5;

Figure 7 is an elevational view partly in cross section taken along the line VII—VII of Figure 6; and Figure 8 is a cross-sectional view of one of the spokes of the steering wheel and of one of the radial arms of the horn accessory taken along the line VIII—VIII of Figure 6.

Referring now to the embodiment of the invention illustrated in Figures 1 to 4 of the drawings, there is shown at 1 a steering wheel of the type commonly employed on present-day automotive vehicles. Steering wheel 1 includes in general a central hub portion 2, a plurality of radial spokes 3, and a rim 4. As is the usual practice, steering wheel 1 is preferably formed of hard rubber, some suitable resinous condensation product, or other suitable plastic material. The central portion of hub 2 is apertured as at 5, and a metallic inner hub 6 is formed therein. Inner hub 6 is centrally apertured as at 7 to permit disposition over the upper end of the steering rod (not shown) and is secured thereto in any suitable manner such as by keying (not shown). Two relatively small longitudinally disposed apertures on either side of central aperture 7 are also provided in inner hub 6 as at 8 and 9 to permit extension therethrough of the operating elements of the horn blowing mechanism which will presently be described.

The upper end of the hub 2 of the steering wheel 1 is recessed as at 10 to permit mounting therein of the horn actuation mechanism 11. Horn actuation mechanism 11 includes a horn blowing member or horn button 12 and a resilient supporting member 13 composed of flexible rubber or some other suitable resilient material. Resilient supporting member 13 is provided with an inwardly facing groove 14 into which a wire member 15 is adapted to be mounted. Wire member 15 is so bent at the top that a portion 16 thereof extends centrally across the openings in the supporting member 13, and other portions 17 and 18 thereof are disposed in groove 14. Wire member 15 also includes two downwardly extending free ends 19 and 20 which are flattened at their lower extremities 22 and 23 to permit engagement with the horn mechanism switching element (not shown) of the usual horn blowing mechanism. In order to ornament the exterior end of the recess 10 of hub 2 and to prevent relatively large foreign particles from falling into this recess when no horn accessory is used, a collar 24 is provided therefor.

In accordance with the teachings of the present invention a novel horn blowing accessory 25 for actuating the horn blowing member is provided for disposition over the steering wheel 1. Horn accessory 25 includes a central hub portion 26, a plurality of radially extending arms 27, and an outer rim 28. Radial arms 27 and rim 28 may be die cast or formed in any other suitable manner and welded or otherwise suitably secured to the central hub or shell portion 26. Hub or shell portion 26 is centrally recessed as at 29 to permit disposition therein of an emblem or other ornamental plate 29. Emblem plate 29 has a downwardly extending threaded stud 30 secured on the underside thereof which extends through a complementary aperture in the depressed portion 28 of hub or shell portion 26. Secured to the lower base of depression portion 28 is a horn button engaging element 31 which has a raised head portion 32 disposed in intimate contact with the depressed portion 28 about stud 30. Element 31 may be conveniently secured to depressed portion 28 by means of a washer 33 and a nut 34 which is adapted to be threaded on the lower threaded end of stud 30 as shown in Figure 3 of the drawings. Supported on the upper side of element 31 is a collar member 35 which extends out over the upper end of hub portion 2 of steering wheel 1 in spaced relationship thereto, as is shown in Figure 3 of the drawings. Disposed between the inner marginal portion of collar member 35 and the lower outer marginal portion of recessed portion 28 is a resilient ring member 36 composed of resilient rubber or some other suitable resilient material.

In order to provide suitable means for detachably securing horn accessory 25 to the steering wheel assembly, a plurality of resilient fingers 37 (preferably 3) are riveted or otherwise suitably secured to the outer edge of collar member 35. The lower ends of fingers 37 are bent inwardly as at 38 and then outwardly as at 39, thereby to permit the fingers 37 to be cammed over the outer head portion 40 of hub portion 2 of steering wheel 1, the outer portion 39, of course, acting as the cam surface therefor. The manner in which the resilient fingers 37 are disposed with respect to the collar member 35 and the remaining elements of the horn accessory 25 may be seen best in Figure 4 of the drawings which shows a plan view of the underside of the central portion of the horn accessory 25.

From the above description it will at once be apparent that I have provided a horn accessory which is economical to manufacture and which may be assembled by an unskilled person on the steering wheel assembly by simply snapping the resilient fingers 37 over the head portion 40 of the hub 2 of steering wheel 1. The horn accessory 25 is thereby detachably secured with a snap-on engagement to the hub portion 2 of the steering wheel 1. To effect operation of the horn blowing button 12 thereafter, it is simply necessary to slightly depress rim 28 of horn accessory 25 with the thumb of the driver's hand while the rest of his hand is still on the rim 4 of steering wheel 1. The horn accessory 25 may be simply and quickly removed from the steering wheel 1 by pulling upwardly on the horn accessory 25, thereby causing portions 38 of resilient fingers 37 to rise upwardly over the head portion 40 of hub 2.

In Figure 5 of the drawings there is illustrated a different embodiment of this invention, and more particularly it shows a horn accessory which is provided with means for making a detachable snap-on engagement with the horn blowing member or horn button rather than with the hub of the steering wheel. Those elements of the assembly which are similar to corresponding elements in the preferred embodiment of the invention have been given the same reference characters. The hub or shell portion 41 of the horn accessory 25 in this instance is not centrally recessed as it was in the preferred embodiment of the invention, although a recess and emblem may be provided if desired. Welded or otherwise suitably secured to the under side of the shell hub or shell portion 41 is horn button engaging element 42 which is provided with a downwardly extending outer lip 43 which directly engages the horn button 44 of the horn blowing mechanism.

As is indicated in Figure 5, the horn button 44 is provided with a slightly different configuration from that which is shown in Figures 1 to 4 of the drawings. More specifically, horn button 44 is secured to a resilient supporting member 45 which carries the horn blowing switch actuating prongs 19 and 20. The resilient supporting member, which may be composed of rubber or any other suitable resilient material, is similar to the supporting member 13 of Figure 3 in its lower portion and differs only from supporting member 13 in that it extends up into intimate contact with the lower surface of horn button 44. The downwardly extending outer marginal portion 46 is provided with a tortuous configuration, as is indicated in Figure 5 and includes an outwardly facing annular groove 47, which is adapted to receive the detachable snap-on securing means of the horn accessory 25.

In order to provide suitable means for making a detachable snap-on engagement of the horn accessory 25 with the horn button 44, a plurality of resilient fingers 48 (preferably 3) are secured to the underside of hub or shell portion 41 of horn accessory 25 as is shown in Figure 5 of the drawings. Fingers 48 are in general similar to fingers 37 of the preferred embodiment of the invention and include an inwardly turned portion 49 and an outwardly turned portion 50. The outwardly turned portion 50 of each spring finger 48 thus provides a cam surface for riding the fingers over the horn button 44 into desired position in outwardly facing groove 47 thereof. To remove the horn accessory 25 from the horn button 44 it is simply necessary to pull upwardly on the former thus causing resilient fingers 48 to be cammed outwardly along their portion 49 until the fingers 48 are free of the horn button 44. The operation of the horn accessory for effecting depression of the horn button 44 is similar in its general operation to that described in connection with the preferred embodiment of the invention.

A third embodiment of the invention is illustrated in Figures 6, 7, and 8 of the drawings. The steering wheel including the hub portion thereof and the horn blowing member and its associated mechanism is precisely the same in this form as was shown and described in connection with Figures 1 to 4 of the drawings and accordingly similar elements of the steering wheel assembly have been given the same reference characters in Figures 6, 7, and 8 as were given to corresponding elements in Figures 1 to 4. The horn accessory, however, differs in two major respects. First, it is provided with means for making a detachable snap-on engagement with the spokes of the steering wheel rather than with the hub of the steering wheel or with the horn button itself as was described in connection with the first and second embodiments of the invention respectively; and second, the rim of the horn accessory has been omitted. More particularly, the horn accessory 51 includes a central hub or shell portion 26 and a plurality of radially extending arms 52 which preferably correspond in number to the number of spokes 3 on steering wheel 1. The central portion of the horn accessory 51 is similar to that illustrated in Figure 3 of the drawings with the exception that the collar member 35 and the spring fingers 37 of Figure 3 have been omitted. More specifically the hub or shell member 26 of horn accessory 51 is provided with a central recess portion 28 into which an emblem or other ornamental plate 29 is adapted to be secured by means of a downwardly extending threaded stud 30 on emblem 29 and a cooperating nut 34. Secured to the underside of recess portion 28 is a horn button engaging element 31 and a resilient ring 36, the former being secured to the underside of recessed portion 28 by means of nut 34, and the latter being held in place by means of the element 31.

The means by which the horn accessory 51 makes a detachable snap-on engagement with spokes 3 will now be described. Secured at or near the outer extremity of each arm 52 is a resilient spoke-engagement element 53 which is substantially of U-shaped cross-sectional configuration (as may be seen in Figure 8). Resilient element 53 may be secured to the underside of arm 52 in any suitable manner such as by welding, riveting, or the like. Two downwardly extending finger portions 54 and 55 are arranged for disposition on either side of a spoke 3 of steering wheel 1. The lower extremities of the finger portions 54 and 55 are curled first inwardly as at 56 and 57 and then outwardly as at 58 and 59 respectively. It will thus readily be understood that fingers 54 and 55 may be snapped under a spoke 3 by virtue of the fact that the lower outwardly extending portions 58 and 59 cam the fingers around the spoke 3.

When horn accessory 51 is in its normal position, that is to say when it is in a position such that horn button 12 is not depressed, inturned portions 56 and 57 of finger portions 54 and 55 are held up in snug engagement with the underside of spokes 3. In this position it is to be noted that the closed center portion of the U is spaced from the upper surface of the spokes 3. Horn accessory 51 is held in this position by virtue of the resilient action of resilient supporting ring 11 of the horn blowing mechanism. To effect operation of the horn blowing member or horn button 12, it is simply necessary to depress one of the arms 52. This causes a rocking movement of the entire horn accessory 51 about the point at which the spring fingers of the two remaining arms engage their cooperating spokes 3.

As will be apparent to those skilled in the art the resilient ring 36 compensates for any slight deviation in the dimensions of the equipment when it is being commercially manufactured. Some such compensating means is desirable to prevent the horn button from being actuated when the spring fingers are snapped over the spokes of the steering wheel if the spring fingers are made slightly too short or if the downwardly extending lip of the horn button engaging element 31 is too long.

From the above description, it will be apparent that I have provided an extraordinarily simple and effective construction for horn accessories which is economical to manufacture, which is rugged and reliable in use, and which may readily be assembled or disassembled on the usual steering wheel assembly of an automotive vehicle by an unskilled person. By providing detachable snap-on means for securing the horn accessory in desired operating position with respect to the steering wheel assembly, it will readily be appreciated that I have provided an extremely desirable commercial article.

While I have shown particular embodiments of my invention, it will, of course, be understood that I do not wish to be limited thereto, since many modifications may be made, and I, therefore, contemplate by the appended claims to cover all such modifications as fall within the true spirit and scope of my invention.

I claim as my invention:

1. The combination with a steering wheel assembly including a steering wheel having a centrally disposed tiltable horn blowing button thereon, of a horn button accessory adapted to be manually actuated to effect operation of said horn button, said accessory having mounting means for making a detachable snap-on engagement with a central portion of said steering wheel.

2. The combination comprising a steering member having a central hub portion and a plurality of spokes extending radially from said hub portion, a depressible horn blowing member centrally mounted within said hub portion, and an accessory for actuating said horn blowing member, said accessory having detachable snap-on means for engaging said hub portion, thereby to secure said accessory thereto.

3. The combination comprising a steering member having a central hub portion and a plurality of spokes extending radially from said hub portion, a depressible horn blowing member centrally mounted within said hub portion, and an accessory for actuating said horn blowing member, said accessory having detachable snap-on means for engaging only the sides and under surface of at least one of said radially extending spokes, thereby to secure said accessory thereto.

4. The combination comprising a steering member having a central hub portion and a plurality of spokes extending radially from said hub portion, a tiltable horn blowing member centrally mounted within said hub portion, and an accessory for actuating said horn blowing member, said accessory comprising a spider and detachable snap-on means for engaging only the sides and under surfaces of said spokes, said means being fixed to said spider to prevent lateral shifting thereof.

5. The combination comprising a steering member having a central hub portion and a plurality of spokes extending radially from said hub portion, a depressible horn blowing member centrally mounted within said hub portion, and an accessory for actuating said horn blowing member comprising a central portion which rests on said horn blowing member and a plurality of radially extending arms having means adjacent their outer extremities for snapping under said spokes, said means normally being out of contact with the top of said spokes.

6. The combination comprising a steering member having a central hub portion and a plurality of spokes extending radially from said hub portion, a depressible horn blowing member centrally mounted within said hub portion, and an accessory for actuating said horn blowing member comprising a central portion which rests on said horn blowing member, and a plurality of radially extending arms having fingers fixed to their outer extremities which extend downwardly around said spokes thereby to limit upward movement of said accessory, said extremities of said arms being normally disposed in spaced relation with said spokes.

7. The combination comprising a steering member having a central hub portion and a plurality of spokes extending radially from said hub portion, a depressible horn blowing member centrally mounted within said hub portion, and an accessory for actuating said horn blowing member comprising a central portion which rests on said horn blowing member and a plurality of radially extending arms having fingers fixed to their outer extremities which are adapted to be cammed over and around said spokes, thereby to permit a snap-on engagement of said accessory on said steering member, said extremities of said arms being normally disposed in spaced relation with said spokes, whereby a depression of the extremities of any one of said arms effects depression of said horn blowing member.

8. The combination with a steering member having a tiltable horn blowing member associated therewith, of an accessory for said horn blowing member comprising a central hub portion and a plurality of radially extending arms, an element having an upraised center portion secured to the underside of said hub portion and a peripheral portion engaging said horn blowing member, resilient means for supporting said horn blowing member, and means for making a snap-on engagement of said accessory with one of said members.

9. The combination with a steering member having a tiltable horn blowing member associated therewith, of an accessory for said horn blowing member comprising a central hub portion and a plurality of radially extending arms, an element having an upraised center portion secured to the underside of said hub portion and a peripheral portion engaging said horn blowing member, resilient means for supporting said horn blowing member, and a plurality of spring fingers secured to said element adapted to detachably engage by a snap-on action a portion of said steering member.

10. The combination with a steering member having a depressible horn blowing member associated therewith, of an accessory for said horn blowing member comprising a central hub portion and a plurality of radially extending arms, a horn blowing member engaging element having an upraised center portion secured to the underside of said hub portion, and a plurality of spring fingers secured to said hub portion adapted to detachably engage by a snap-on action a portion of said horn blowing member.

11. The combination with a steering member having a depressible horn blowing member centrally associated therewith, of an accessory for said horn blowing member comprising a central portion and an outer portion arranged for manual actuation, a horn blowing member engaging element mounted on the underside of said central portion, an ornamental plate member disposed on the outer side of said central portion and having means formed thereon for extending through said central portion into securing engagement with said element, and means for making a snap-on engagement of said accessory with one of said members.

12. The combination comprising a steering member, a depressible horn blowing member centrally mounted on said steering member, said horn blowing member being provided with a radially outwardly opening groove, and an accessory for actuating said horn blowing member, said accessory having detachable snap-on means for engaging said horn blowing member within said groove, thereby to secure said accessory thereto.

13. The combination comprising a steering member, a depressible horn blowing member centrally mounted on said steering member, said horn blowing member being provided with a radially outwardly opening groove, and an accessory for actuating said horn blowing member, said accessory having a plurality of downwardly extending spring fingers adapted to be cammed into snap-on securing engagement with said horn blowing element within said groove.

14. The combination comprising a steering member having a central hub portion and a plurality of spokes extending radially from said hub portion, said hub portion having an annular ridge on its side wall, a depressible horn blowing member centrally mounted within said hub portion, and an accessory for actuating said horn blowing member, said accessory having detachable snap-on means for engaging said hub portion below said ridge, thereby to secure said accessory thereto.

15. As an article of manufacture for a steering wheel assembly including a steering member and a depressible horn blowing member centrally mounted therewith, an accessory for actuating said horn blowing member comprising a member disposed over said horn blowing member and having a plurality of downwardly extending resilient fingers fixed thereto for making a detachable snap-on mounting engagement with one of said members, said accessory also including means separate from said fingers for engaging said horn blowing member at at least two widely spaced points.

16. As an article of manufacture for a steering wheel assembly including a steering wheel having a centrally disposed depressible horn blowing button thereon, a horn button accessory adapted to be manually actuated to effect operation of said horn button, said accessory having mounting means including a plurality of downwardly extending resilient fingers adapted to be cammed into detachable snap-on engagement with a portion of said steering wheel assembly, said accessory also including means separate from said fingers for engaging said horn blowing button at at least two widely spaced points.

17. A horn button actuator comprising a central portion, rigid means on the underside of said central portion for engaging the top of a horn button at not less than three non-colinear spaced points, and resilient fingers spaced outwardly from said engaging means and forming a snap-on securing means for holding said actuator in place.

18. A remote control for a flat round horn button that will make a contact when it is tilted by depressing its edge at any point, said control comprising a central member having a depending circular flange adapted to rest on the top of said horn button near its periphery, arms radiating from said central member by means of which said central member and said horn button may be tilted by moving the end of any one of said arms, and means for holding said central member and arms with said flange in said position on said horn button while permitting tilting movement thereof.

19. A remote control for a flat round horn button that will make a contact when it is tilted by depressing its edge at any point, said control comprising a central member, an inverted saucer-like member fixed to the underside of said central member and having a depending circular flange adapted to rest on the top of said horn button near its periphery, arms radiating from said central member by means of which said central member and said saucer-like member and said horn button may be tilted by moving the end of any one of said arms, and means for holding said central member and arms with said flange in said position on said horn button while permitting tilting movement thereof.

GEORGE ALBERT LYON.